T. A. EDISON.
BATTERY CELL CONTAINER.
APPLICATION FILED JAN. 27, 1911.
1,034,003.
Patented July 30, 1912.
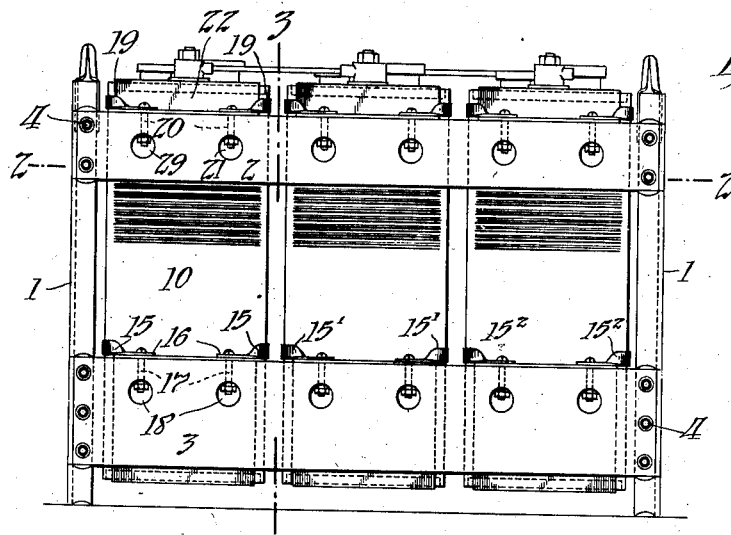
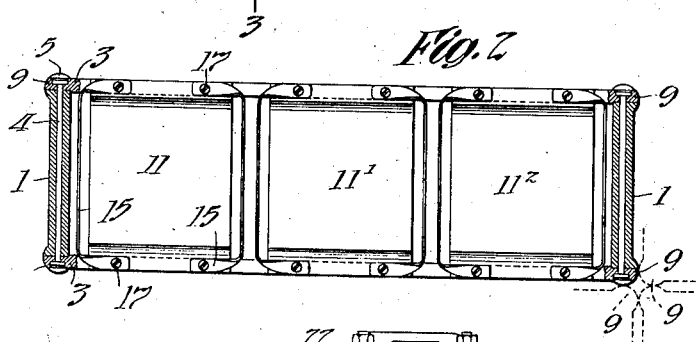
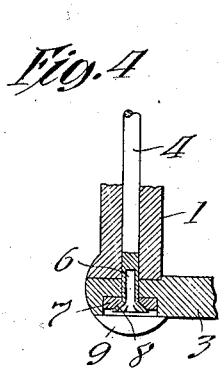
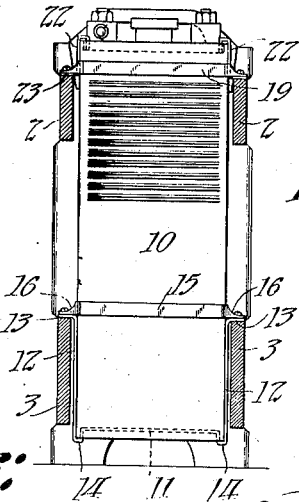
Witnesses:
Frank D. Lewis
Dyer Smith
Inventor:
Thomas A. Edison
by Frank L. Dyer
his Atty.

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

BATTERY-CELL CONTAINER.

1,034,003.  Specification of Letters Patent.  Patented July 30, 1912.

Application filed January 27, 1911. Serial No. 604,928.

*To all whom it may concern:*

Be it known that I, THOMAS A. EDISON, a citizen of the United States, and a resident of Llewellyn Park, Orange, Essex county, New Jersey, have invented a certain new and useful Battery-Cell Container, of which the following is a description.

My invention relates to a container or tray for holding cells of batteries, and particularly the metallic cans in which are inclosed the elements of the Edison storage battery.

The object of my invention is to produce such a structure in which a plurality of cells may be firmly held out of contact with each other and in such a manner that the danger of short circuiting between the cells will be obviated, and also to hold the cells so firmly as to prevent independent movements of the same when the structure is shaken or vibrated, as it needs must be when contained in an automobile or other vehicle. Heretofore, the cells of the battery have been so mounted that they are likely to become loose in the tray, and the electrolyte is apt to be shaken out of the gassing openings in the cells when the same are carried by an automobile. By my invention I provide an efficient, simple structure of the type indicated, in which the parts may easily be mounted and adjusted or removed when desired.

My invention also consists in the construction of parts and combinations of elements hereinafter more particularly described and set forth in the appended claims.

In order that my invention may be more clearly understood, attention is hereby directed to the accompanying drawings, forming part of this specification, and illustrating a preferred form of my invention.

In the drawings—Figure 1 represents a side view of a container embodying my invention, with three storage battery cans or cells carried thereby; Fig. 2 represents a cross section on line 2—2 of Fig. 1, the cells not being shown; Fig. 3 represents a section taken upon line 3—3 of Fig. 1; and Fig. 4 represents in section an enlarged detail of a fastening means shown in Fig. 2.

Referring to the drawings, the container comprises a frame formed of the upright end members 1, 1 and the upper and lower side strips 2, 2 and 3, 3. These members are preferably of wood. The side strips 2 and 3 may be secured to the end members in any desired manner, as by means of the bolts 4. I prefer to form the joint in the manner illustrated in Figs. 2 and 4, in which one end of the bolt or member 4 is provided with a head 5 and the other end with a drilled hole 6 axially of the member. The bolt 4 is passed through the members to be secured together with the head 5 positioned within a suitable recess in one side member 3, and a punch or similar instrument is forced into the opening 6 in the other end of the bolt and manipulated to force the metal surrounding the end of the opening 6 outwardly into contact with the face of the other member 3, or preferably into contact with the washer 7 positioned within a suitable countersunk recess in the member 3, as shown in Fig. 4. An efficient holding means 8 is thus provided upon the end of bolt 4.

Preferably the corners of the frame are rounded, as shown at 9, the rounded corners projecting beyond the planes in which are located the outer faces of the end and side members, so that when a plurality of trays containing cells are placed side by side or end to end, the rounded corners of the same will abut against each other, as shown in dotted lines in Fig. 2. By this means an air space is provided between adjacent trays or containers.

Each individual cell as 10 may be supported by a horizontal member 11, 11' or 11² supported by vertical side members 12, 12 shown in Fig. 3, having horizontally extending lugs 13, 13 on the upper ends of the same resting upon the upper surfaces of side strips 3, 3. The bottom members as 11 are preferably integral with the side members as 12, 12 and may be formed of sheet metal. Side members 12, 12 are adapted to fit closely against the sides of a cell positioned between the same and prevent movement of the same in a direction at right angles to side strips 3. The bottom members are positioned some distance above the surface upon which the frame rests to prevent short circuiting between the cells, which are also placed some distance apart from the end members 1, as shown. When the container is for use in connection with cans having downwardly extending flanges on the bottom thereof, as in the case of the Edison storage battery cells, a depression 14 is formed between bottom 11 and side member 12 on each side of the bottom 11, within which recess or depression the flanges on the bottoms of the cans are adapted to rest.

In order to prevent movement of the cells relative to the frame in a direction parallel to the side members 2 and 3, metallic straps 15, 15, 15', 15', 15², 15², are positioned above side members 3, 3 to engage the sides of the cells parallel to the end members 1, 1. These straps are provided at their ends with flanges as 16, 16 which rest upon the flanges 13, 13 of vertical side members 12, 12, whereby the straps and side members may be secured together to side strips 3, 3. This may be accomplished, as illustrated, by small bolts 17, 17, etc., which pass vertically downward through flanges 16, 16, 13, 13, into side strips 3, horizontal openings 18, 18, etc., preferably being provided in side strips 3, so that access may be had to the nuts upon the lower ends of bolts 17 to tighten the same. When a can or cell is positioned within one of the receptacles thus provided, its bottom will rest upon member 11 and it will be contacted upon all four sides by side members 12, 12 and straps 15, 15.

Straps 19, 19, etc., similar to straps 15, 15, are positioned above the upper side strips 2 by bolts 20, 20, etc. passing downwardly into side strips 2, horizontal openings 21 being provided for the adjustment of the nuts thereof in the same manner as described in connection with the lower strap 15. After the can or cell has been positioned within the container so far described, vertical members 22, 22, etc., may be positioned to hold the can against vertical movement. Vertical members 22 are formed with horizontally extending projections at the bottom end thereof adapted to press upon the top of the can, and with horizontally extending flanges 23 upon the lower ends thereof adapted to rest upon the upper surfaces of side strips 2. I prefer to first mount vertical members 22 in position with their flanges 23 resting upon the upper surfaces of strips 2, and to then adjust strips 19 with their flanges resting upon flanges 23, and secure the vertical members 22 and the straps 19 both firmly to strips 2 by passing bolts 20 through both sets of flanges, as shown. In the case of cans having vertical flanges extending around the upper edges of the same, as in the case of the Edison storage battery, the bent upper portions of members 22 would extend over and around the flanges, as illustrated in Fig. 3. By the various means described, a simple and effective device of the character described, easily set up and easily taken apart, is provided. After the desired number of cans or cells are positioned within the container, I preferably coat the exterior of the cells and the container with a suitable insulating compound.

Having now described my invention, what I claim and desire to protect by Letters Patent is as follows:—

1. The combination with a battery tray, of a series of battery cells rigidly supported thereby, insulated and separated from each other and with a free space below the bottoms of said cells, substantially as described.

2. A battery cell container for a plurality of cells, comprising a frame, adapted to stand upon a supporting surface, and separate means for each cell secured to said frame for supporting cells out of contact with each other, and said frame, said means being out of contact with said surface, substantially as described.

3. A container for battery cells, comprising a frame adapted to stand upon a supporting surface, and means for supporting a plurality of cells out of contact with each other, and for preventing movement of the same relative to the frame, the said means being operative to support and position each cell independently of the other cells, substantially as described.

4. A container for battery cells, comprising a frame adapted to stand upon a supporting surface, and means for supporting a plurality of cells out of contact with each other, and for preventing lateral movement of the same relative to the frame, the said means being operative to support and position each cell independently of the other cells, substantially as described.

5. A battery cell container comprising a frame, a horizontal member for supporting a cell, secured to said frame, said member being adapted to fit within flanges on the bottom of the cell and hold the same in raised position, and means secured to said frame for preventing lateral movement of a cell placed between the same, substantially as described.

6. A battery cell container, comprising a frame, consisting of end and side members secured together, supporting means for a cell and straps adapted to contact the sides of a cell, secured to said side members, substantially as described.

7. A battery cell container, comprising a frame, consisting of end and side members secured together, a member for supporting a cell, having portions parallel to said side members adapted to contact two sides of a cell and supported from said side members, and straps secured to said side members adapted to contact the other two sides of the cell, substantially as described.

8. A battery cell container, comprising a frame, consisting of end and side members secured together, members adapted to contact the sides of a cell placed between said end and side members for preventing lateral movement of the cell, and means adapted to contact the top of the cell to prevent upward movement of the same, said contacting members and means being secured to said frame, substantially as described.

9. A battery cell container, comprising a frame consisting of end members and upper and lower side strips secured thereto, bottom members and side straps secured to said lower strips for supporting cells at spaced intervals and preventing lateral movement of the same relative to said frame, and side straps secured to said upper strips adapted to contact the sides of cells to prevent lateral movement of the same, substantially as described.

10. A battery cell container, comprising end members and side strips secured thereto, means for supporting a cell between said members and strips and preventing movement thereof in a direction parallel to said end members, and means for preventing movement of said cell in a direction parallel to said side strips, all said means being supported from said strips, substantially as described.

11. The combination of a battery tray, comprising a frame having at its corners surfaces projecting beyond the planes occupied by the sides of the frame, and a plurality of battery cells rigidly supported thereby, insulated and separated from each other and with a free space below the bottoms of said cells, substantially as described.

12. A container for battery cells, comprising a frame adapted to stand upon a supporting surface, the corners of said frame being formed with surfaces projecting beyond the planes occupied by the sides of the frame, and means for supporting a plurality of cells out of contact with each other, and for preventing movement of the same relative to the frame, the said means being operative to support and position each cell independently of the other cells, substantially as described.

13. A container for battery cells, comprising a frame adapted to stand upon a supporting surface, the corners of said frame being formed with surfaces projecting beyond the planes occupied by the sides of the frame, and means for supporting a plurality of cells out of contact with each other, and for preventing lateral movement of the same relative to the frame, the said means being operative to support and position each cell independently of the other cells, substantially as described.

This specification signed and witnessed this 25th day of January 1911.

THOMAS A. EDISON.

Witnesses:
 DYER SMITH,
 ANNA R. KLEHM.